United States Patent
Sim

(10) Patent No.: US 8,341,432 B2
(45) Date of Patent: Dec. 25, 2012

(54) METHODS OF INVOKING VARIOUS FUNCTIONS OF A DIGITAL MEDIA PLAYER USING A SINGLE SWITCH OF THE DIGITAL MEDIA PLAYER

(75) Inventor: Wong Hoo Sim, Singapore (SG)

(73) Assignee: Creative Technology Ltd, Singapore (SG)

( * ) Notice: Subject to any disclaimer, the term of this patent is extended or adjusted under 35 U.S.C. 154(b) by 756 days.

(21) Appl. No.: 11/916,256

(22) PCT Filed: May 31, 2006

(86) PCT No.: PCT/SG2006/000135
§ 371 (c)(1),
(2), (4) Date: Dec. 11, 2009

(87) PCT Pub. No.: WO2006/130115
PCT Pub. Date: Dec. 7, 2006

(65) Prior Publication Data
US 2010/0106981 A1    Apr. 29, 2010

(30) Foreign Application Priority Data
May 31, 2005 (SG) ............... 200503417-8

(51) Int. Cl.
*G06F 1/00* (2006.01)
(52) U.S. Cl. ...................... 713/300; 713/310
(58) Field of Classification Search ........... 713/300, 713/310
See application file for complete search history.

(56) References Cited

U.S. PATENT DOCUMENTS

| | | | |
|---|---|---|---|
| 6,614,206 B1 * | 9/2003 | Wong et al. | 320/136 |
| 6,665,801 B1 | 12/2003 | Weiss | |
| 6,774,604 B2 * | 8/2004 | Matsuda et al. | 320/110 |
| 6,944,701 B2 * | 9/2005 | Yu et al. | 710/300 |
| 7,310,697 B2 * | 12/2007 | Pandit et al. | 710/313 |
| 7,447,922 B1 * | 11/2008 | Asbury et al. | 713/300 |
| 2002/0038432 A1 * | 3/2002 | Hsu | 713/300 |
| 2003/0110403 A1 * | 6/2003 | Crutchfield et al. | 713/300 |
| 2006/0261788 A1 * | 11/2006 | May | 323/273 |

OTHER PUBLICATIONS

Music to Go. Media Player for Windows CE Delivers High Quality. Must-Have Downloads. Jul. 2001. vol. 7 Issue 7 pp. 94-95. http://www.smartcomputing.com/editorial/article.asp?article=articles/archive/10707/43107/43107.asp&guid= Last accessed on Oct. 19, 2009.

* cited by examiner

Primary Examiner — Chun Cao
(74) Attorney, Agent, or Firm — Creative Technology Ltd

(57) ABSTRACT

There is provided a method for charging a power source of a digital media player (20) using a cable (24) connected to a computer (34), and also a method for activating a lower volume during playback of content on the digital media player (20). Both methods may be triggered by a toggling switch (22) on the media player (20).

4 Claims, 3 Drawing Sheets

METHODS OF INVOKING VARIOUS FUNCTIONS OF A DIGITAL MEDIA PLAYER USING A SINGLE SWITCH OF THE DIGITAL MEDIA PLAYER

FIELD OF INVENTION

This invention relates to methods of invoking various functions of a digital media player using a single switch of the media player.

BACKGROUND OF INVENTION

Currently, the normal charging function (through a USB port, IEEE 1394 Firewire port, or custom multiple-pin connection) of a media player can only be activated with the installation of a driver in the Operating System (OS) of a computer. Without the prior installation of the driver, upon connecting the media player to the computer via a cable, the computer would automatically install a standard driver provided with the OS of the computer and the media player would be identified only as a mass storage class device due to the non-volatile memory in the media player. Such a classification of the media player in the OS of the computer minimizes the flow of current into the media player and significantly prolongs the duration required to charge the battery of the media player. Furthermore, such a process is automatic and when connected to the computer charging takes place whether or not it is required or desired.

There are currently also no single step music-conversation mixing controls on digital media players. Volume controls (mechanical scrollers or digital controls) have been used thus far in the media players to allow the user to vary the volume levels of the content of the media player while/prior to carrying out a conversation while listening to playback of content in the media player.

SUMMARY OF INVENTION

According to a first preferred aspect there is provided a method for charging a power source of a digital media player using a cable. The method comprises toggling a switch on the media player to activate firmware in the media player; connecting a first end of the cable to a port on the media player; and connecting a second end of the cable to a port on the computer. The firmware detects connection of the media player to the computer via the cable. Current is drawn into the media player to charge the power source in the media player.

Advantageously, a driver for the media player is not required to be installed in an operating system ("OS") of the computer. A digital media player that can charge a power source using the method is also provided.

Preferably, the power source is selected from either capacitors or batteries. It is also preferable that the port on the computer is selected from USB, IEEE 1394 Firewire or a custom multiple-pin connector.

According to a second preferred aspect there is provided a method for activating a lower volume level during playback of content on a digital media player by toggling a switch at least once on the media player. Preferably, the lowered volume level allows for a user of the media player to listen to ambient sounds—sounds audible to the user from other than the digital media player. The volume level may be reverted to its original level either by toggling the switch again, or by automatically reverting of the volume level to its original level after a predetermined time. Advantageously, the sounds surrounding the user include a conversation either carried out with another party, or carried out over a telephone. The telephone may be a fixed-line phone, mobile phone, or video phone. It is preferable that the lowered volume level is customisable. A digital media player that can activate a lower volume level during playback of content using the aforementioned second embodiment is also provided.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

In the drawings.

DESCRIPTION OF THE PREFERRED EMBODIMENTS

The following discussion is intended to provide a brief, general description of a suitable computing environment in which the present invention may be implemented. As those skilled in the art will appreciate, the invention may be practiced with other computer system configurations, including hand-held devices, multiprocessor systems, microprocessor-based or programmable consumer electronics, minicomputers, and the like.

Figure 1:
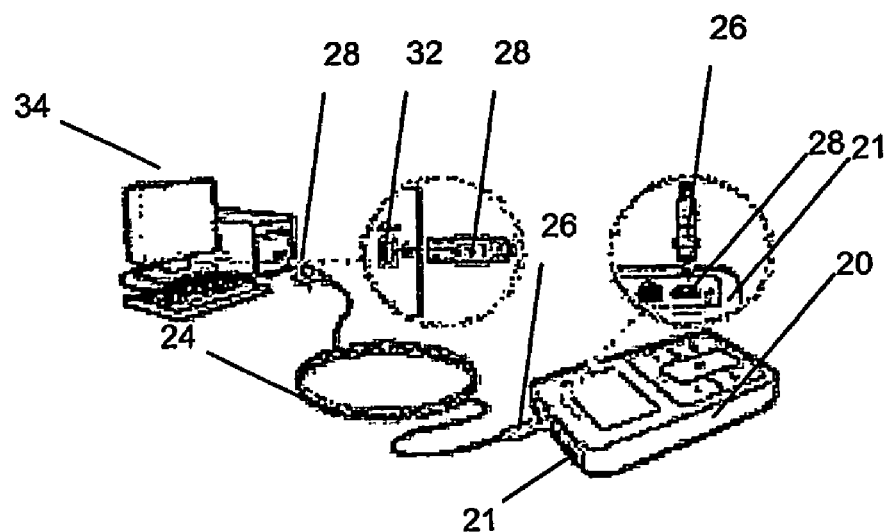
FIG. 1 is a perspective view of a preferred first embodiment.

Referring to FIG. 1, there is shown a perspective view of a preferred setup for a first embodiment of the present invention. There is provided a digital media player 20 and a computer 34. The media player 20 and the computer 34 may be connected physically and electrically using a cable 24. A first end 26 of the cable 24 may be connected to a port 30 on a top face 21 of the media player 20. A second end 28 of the cable 24 may be connected to a port 32 on the computer 34. While the cable 24 shown in FIG. 1 appears to be a USB cable from the appearance of the ends 26, 28, the actual cable used may depend on the type of cable(s) usable by the media player 20 and the connectors at the ends of the cable 24.

Figure 2:
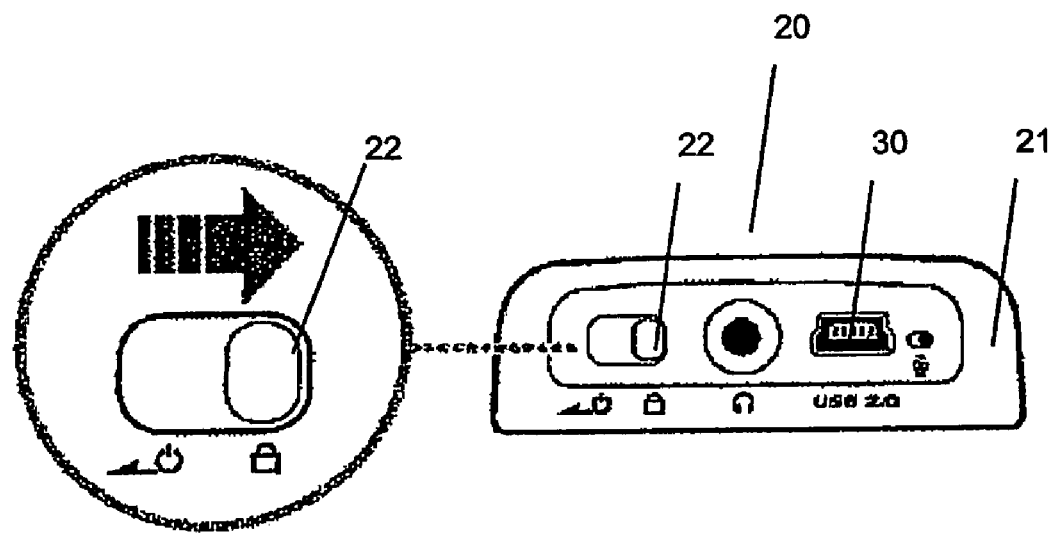
FIG. 2 is a view of a top face of a media player.

Referring to FIG. 2, there is shown a top face 21 of the media player 20. A switch 22 that may be used to turn on/off the media player 20 is shown. In a preferred embodiment, the switch 22 may also be used as a "hold" switch 22 on the media player 20. The "hold" switch 22 locks a current functional mode and all controls of the media player 20. The switch 22 may be a biased switch such that it is biased to one of the two positions shown, when not in use. This may be a predetermined one of the two positions and is preferably the "hold" position on the left in FIG. 2.

Toggling the "hold" switch 22 on the media player 20 may also be used to trigger a charging mode for the power source of the media player 20 without the installation of a driver in the OS of the computer 34. Typically, the media player 20 would be recognized as a "mass storage class device" when connected to a computer 34 such as a personal computer ("PC") if the requisite driver(s) is not installed in the OS of the computer 34. This is due to the presence of non-volatile memory in the media player 20. However, after toggling the "hold" switch 22 to the right as shown in FIG. 2, firmware in the media player 20 may instruct the media player 20 to draw more current than the current usually drawn by mass storage class devices to enable faster charging of the power source of the media player 20.

Alternatively, when the media player 20 is in use, the "hold" switch 22 may also be toggled to act as a trigger to activate a pre-programmed volume control mode. This feature may enable a user of the media player 20 to listen to the content of the media player 20 while simultaneously listening to ambient sounds—sounds from the surroundings and not the media player 20, such as, for example, a conversation while with another party, a pet, a mechanized voice recognition device, and so forth. The conversation may also be over a communications device like a telephone (fixed line, mobile, videophone or otherwise), or a walkie-talkie.

Figure 3:
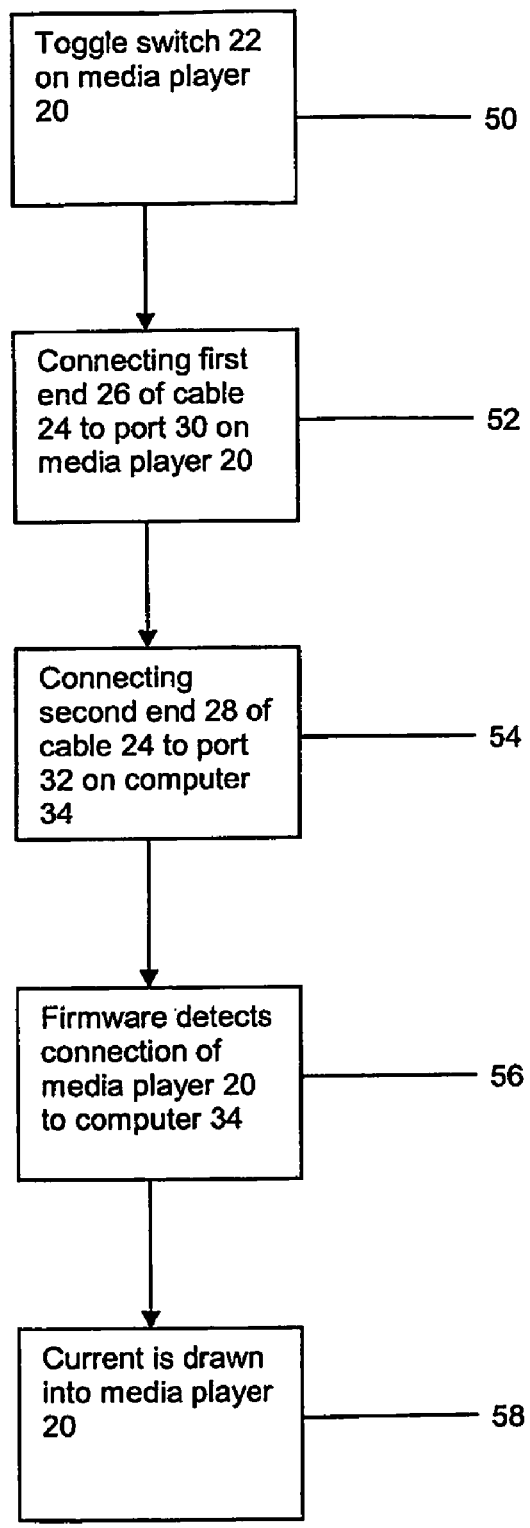
FIG. 3 is a flow chart of a method of operation of the first embodiment.

Referring to FIG. 3, there is shown a flow chart of a preferred embodiment of a first embodiment of the present invention which is a method of toggling the "hold" switch 22 to trigger charging of the media player 20 when connected to the computer 34. First, the "hold" switch 22 on the media player 20 is toggled to activate firmware in the media player 20 (50). Subsequently, the first end 26 of the cable 24 may be connected to the port 30 of the media player 20 (52) and the second end 28 of the cable 24 may be connected to the port 32 on the computer 34 (54). The process of connecting the ends 26, 28 of the cable 24 may be reversed. At this juncture, firmware in the media player 20 detects electrical and physical connection of the media player 20 to the computer 34 via the cable 24 (56). Firmware in the media player 20 instructs the media player 20 to draw a current normal for mass storage class devices, and may instruct the media player 20 to draw more current than the current usually drawn by mass storage class devices to enable faster charging of the power source of the media player 20. Current is drawn into the media player 20 to charge the power source in the media player 20 (58). This charging process is done without any driver installation for the media player 20 on the OS of the computer 34. The power source of the media player 20 may be either capacitors or batteries. The port 32 on the computer 34 may be a USB port, an IEEE 1394 Firewire port or a custom multiple-pin connection.

Figure 4:
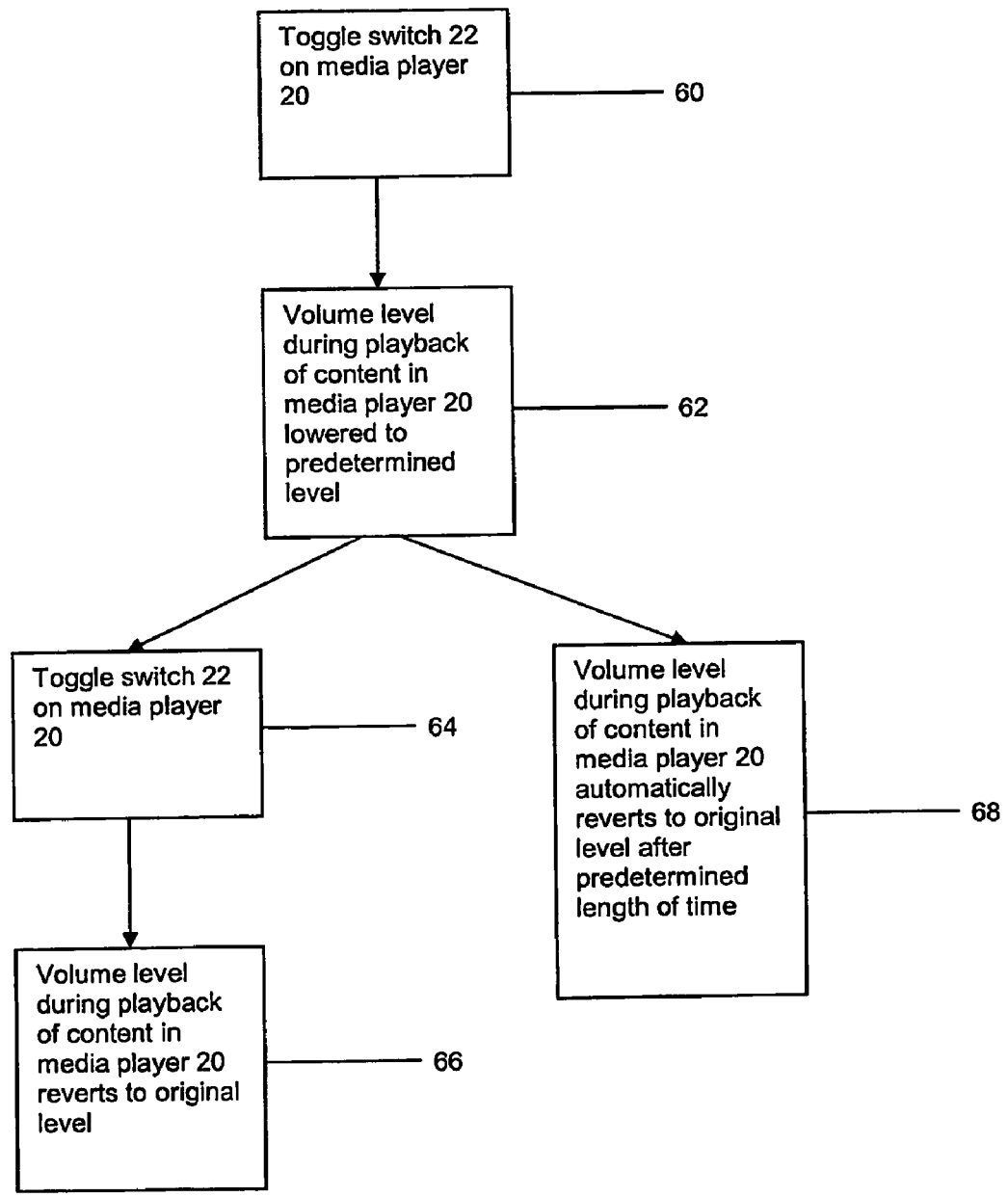
FIG. 4 is a flow chart of a method of operation of a second embodiment.

Referring to FIG. 4, there is shown a flow chart of a preferred embodiment of a second embodiment of the present invention which is a method of toggling the "hold" switch 22 to activate a pre-programmed volume control mode when the media player 20 is in use. Firstly, the "hold" switch 22 on the media player 20 is toggled (60) during playback of content in the media player 20 to activate a lower predetermined volume level (62). The predetermined volume level may be pre-set during manufacturing of the media player 20 or may be customisable by a user. Subsequently, there may be two ways that the volume level reverts to its original level prior to toggling the "hold" switch 22.

A first way would be to toggle the "hold" switch 22 again (64) to revert the volume level to its original level (66). A second way would be to set a predetermined time in the media player 20 after which the volume level automatically reverts to its original level (68). The predetermined time to revert to its original volume level may also be pre-set during manufacturing or may be customisable by the user. The "hold" switch 22 may also be multi-stepped such that a plurality of times toggling the "hold" switch 22 would lower the volume progressively and the volume may only be restored to its original level after a pre-determined time that may also be pre-set during manufacturing of the media player 20 or may be customisable by the user.

The "hold" switch 22 may also simply be a specifically programmed switch/button, or any other switch/button on the media player 20.

Whilst there has been described in the foregoing description preferred embodiments of the present invention, it will be understood by those skilled in the technology concerned that many variations or modifications in details of design or construction may be made without departing from the present invention.

The invention claimed is:

1. A method for charging a power source of a digital media player using a cable, comprising:
   toggling a multiple function switch on the media player to activate firmware in the media player;
   connecting a first end of the cable to a port on the media player;
   connecting a second end of the cable to a port on a computer;
   detecting of a connection of the media player to the computer via the cable by the firmware; and
   drawing of a higher current than that usually drawn by mass storage class devices via the cable into the media player to charge the power source in the media player, wherein a driver for the media player is not required to be installed in an operating OS of the computer, and
   wherein the firmware of the media player instructs the media player to draw higher current from the computer.

2. The method as claimed in claim 1, wherein the power source is selected from the group consisting of: capacitors and batteries.

3. The method as claimed in claim 1, wherein the port on the computer is selected from the group consisting of: USB, IEEE 1394 Firewire and a custom multiple-pin connector.

4. The method as claimed in claim 1, wherein the switch is biased to a predetermined position when not in use.

* * * * *